Figure 1:
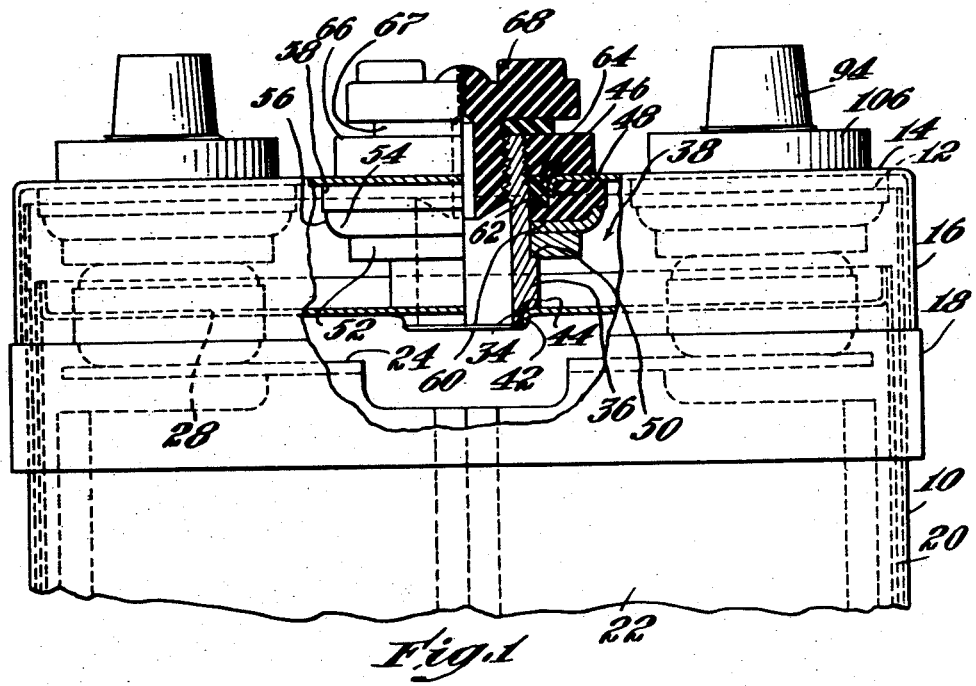

Dec. 14, 1948.  C. BERG ET AL  2,456,246
BATTERY GLAND FOR TERMINALS OR VENTS
Filed May 15, 1947

Inventors
Carl Berg
Marcus Berg
by Gobert, Cushman & Grove
att'ys.

Patented Dec. 14, 1948

2,456,246

UNITED STATES PATENT OFFICE 2,456,246

BATTERY GLAND FOR TERMINALS OR VENTS

Carl Berg, Northampton, and Marcus Berg, Easthampton, Mass., assignors to Nickel Cadmium Battery Corporation, Easthampton, Mass., a corporation of Delaware Application May 15, 1947, Serial No. 748,276

6 Claims. (Cl. 136—168)

1

This invention relates to battery construction and more particularly to improvements in packing glands for terminal posts and filling vents in storage batteries.

In storage batteries of conventional construction it is usual to mount a number of cells in a battery case, join them in series or parallel, and seal the top of the case with certain of the terminal posts and vents extending through it. As thus constructed there are spaces between the top and side walls of these cells and the top and side walls of the case, and the principal objects of this invention are to provide an improved gland construction for the passage of the terminal posts or filling vents through the tops of the cells and case of the battery which will prevent egress of electrolyte from the battery cells into the intervening spaces between the cells and the case, which will be simple in construction, easy to assemble and durable.

According to one of the broader aspects of the invention, a gland forms a liquid-tight passage for a lead-in member such as a post or vent passing through an aperture in a wall of a battery, that is, the top wall of the cell or battery case, or through apertures in both cases. As illustrated herein, the gland includes a rigid washer disposed around the lead in member at one side of the wall, which washer is restrained from movement lengthwise of the member by suitable holding means associated with the member, a deformable washer positioned between the rigid washer and the wall, the deformable washer having an annular recess in one surface into which there extends a flange bordering the aperture in the wall, and means such as a nut threaded onto the lead in member at the opposite side of the wall for squeezing the deformable washer between the wall and the rigid washer. The rigid washer has a peripheral flange which embraces a portion of the deformable washer to prevent lateral expansion thereof under pressure, and there is disposed in the annual recess of the washer, between the lead in member and the flange, a second deformable washer adapted to fill the space and be pressed by deformation against the flange.

In a somewhat more specific aspect of the invention the aforesaid lead in member comprises a vent and filling tube welded at its lower end into an aperture formed in the top wall of a cell and extending upwardly therefrom through an aperture in the top wall of the case. The tube has a lateral shoulder below the top wall of the case upon which rests the rigid washer and the deformable washer as above mentioned, and a nut is threaded onto the tube above the top wall of the case by which the top wall may be caused to squeeze the deformable washer between it and the rigid washer. The sleeve is threaded inter-

2 nally at its upper end for reception of the usual vent and closing cap.

In another aspect of the invention the member comprises a terminal post welded at its lower end to a bar joining alternate ones of the battery plates of a given cell and passing through an aperture in the top of the cell or the top of the case. In this form the rigid washer surrounds the post below the top of the cell and rests against the aforesaid bar. The deformable washer is supported by the rigid washer and has a recess in its top surface for reception of a down-turned flange bordering the aperture in the top of the cell, and a second deformable washer, the top of which projects above the top of the cell. Overlying the top of the cell is a deformable washer like the first one, having an annular recess in its bottom surface for reception of the upper portion of the second deformable washer, and there is a nut threaded on the post for squeezing this like deformable washer to cause it, together with the first deformable washer, to embrace the top of the cell and to cause the top of the cell and the rigid washer to compress the first deformable washer.

Figure 2:
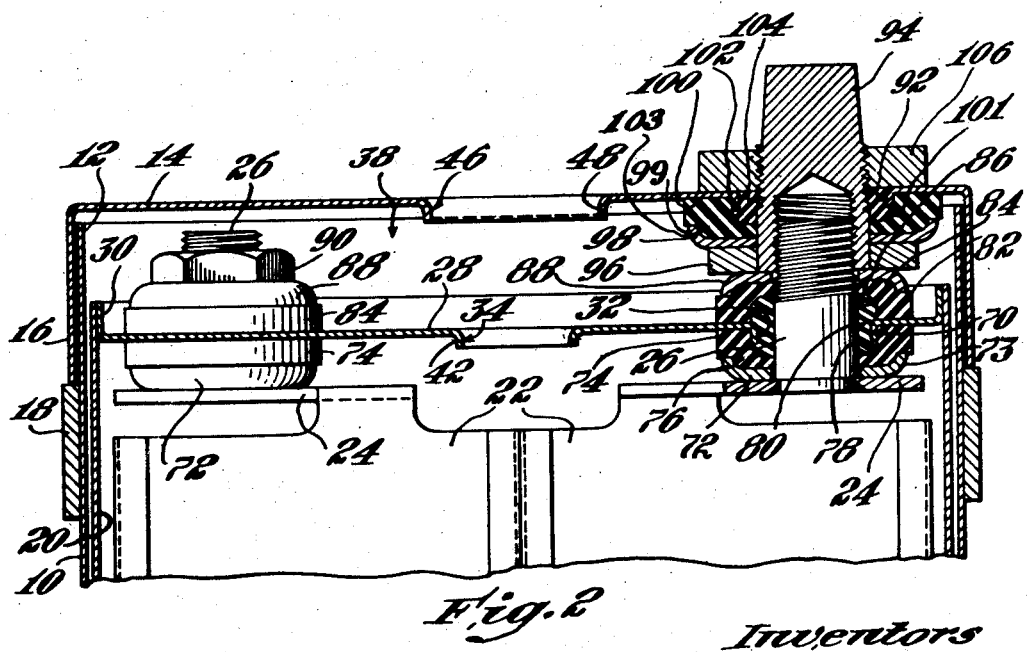

The invention will now be described in its various aspects with reference to the accompanying drawing in which:

Fig. 1 is an elevation of a storage battery of the type with which this invention is concerned, broken away in part and sectioned to show a filling and vent tube; and Fig. 2 is a section parallel to the section of Fig. 1, through the battery and one terminal post and the gland therefor, a second post being shown in elevation and the vent being omitted for the sake of clarity.

The figures show a conventional storage battery with an outer case 10 of generally rectangular form having an open top 12 which is closed by a cover 14 having a peripheral, downwardly projecting flange 16 terminating in a band 18 which is preferably secured to the walls of the outer casing 10 in a liquid-tight manner. Within the outer casing 10 there are disposed one or more cells 20, each of which has in it battery plates 22, alternate ones of which are joined at their upper ends by bars 24, the latter having welded thereto terminal posts 26. The posts for each cell pass upwardly through a cover 28 closing the top of the cell. The covers have upturned peripheral flanges 30 adapted to engage the inside open ends of the cells and to be welded thereto. The cover 28 of each cell has apertures 32 (Fig. 2) therein for the passage of the terminal posts, and an aperture 34 for the reception of a filling and vent tube 36.

In a battery, as thus constructed, if the electrolyte leaks into the space 38 between the tops 28 of the cells and the top 14 of the battery outer casing, there is no way for it to escape, and if it accumulates therein it will spill over between the walls of the outer casing and the cell walls, thereby causing corrosion and ultimate destruction of the battery. To prevent this the invention, as illustrated herein, is concerned primarily with improved glands for both the filling vent tubes and the terminal posts to prevent the electrolyte from creeping upwardly along these members into the space 38 and from there into the space between the walls of the cells and the battery case.

Referring particularly to the filling vent tubes 36 (Fig. 1), each tube 36 is caused to pass from the cover of a given cell without interruption directly up through the cover of the case, the improved gland in this instance forming a liquid-tight seal between the tube and the cover of the casing. As seen in Fig. 1, the filling and vent tube 36 is welded at its lower end into the aperture 34 in the cover 28 of the cell. To secure a liquid-tight joint at this point a down-turned flange 42 is formed around the aperture, to provide a bordering convex surface, a shoulder 44 is formed in the lower end of the tube 36 for engagement with the convex surface formed by the flange, and the mating surfaces are welded together. The tube 36 passes vertically upward through the space 38 and through an aperture 46 formed in the cover 14, this aperture having a down-turned bordering flange 48. On the tube below the cover 14 there is formed an annular shoulder 50 which forms a support for a rigid washer 52 surrounding the tube 36, and this washer in turn forms a support for a second rigid washer 54 which is cup-shaped, having at its peripheral edge an upturned flange 56. Seated in the cup-shaped washer 54 and surrounding the sleeve 36 is a deformable washer 58 having on its undersurface a protuberance 60 fitting into the cup-shaped washer 54, and in its upper face an annular recess 62 for reception of the down-turned flange 48 bordering the aperture 46 and also of a second deformable washer 64. A nut 66 composed of metal coated with a suitable insulating material or composed wholly of insulating material is threaded onto the sleeve 36 above the cover 14, and by engagement with the cover will force the same upon rotation of the nut downwardly to squeeze the deformable washer 58 between it and the rigid cup-shaped washer 54. Simultaneously the second deformable washer 64 is compressed to fill the annular recess 62 in the upper face of the deformable washer 58 thereby to form a liquid-tight seal with the tube 36.

A cap 68 of the conventional type is threaded into the top of the sleeve 36, and to make it liquid-tight a deformable washer 67 may be interposed between its head and the top of the nut 66. As usually constructed, there will be one filling and vent tube for each cell, hence the number of filling and vent tubes extending through the cover of the case will depend upon the number of cells it contains.

If there are several cells in the battery case, only the terminal posts 26 in the end cells are carried above the cover 14, as shown at the right side of Fig. 2, the intermediate posts being terminated below the cover, as shown at the left in Fig. 2. In either case, glands similar to that described above with respect to the filling vent tubes are provided, as will now appear.

Referring to Fig. 2, each aperture 32 in the cover 28 of each cell has a down-turned flange 70 bordering it, corresponding to that numbered 48 shown in the cover 14 for the vent tube 36. Surrounding each terminal post 26 and resting against the bar 24 below the cover of the cell is a rigid cup-shaped washer 72 having an upturned flange 73 corresponding to washer 54 of Fig. 1 in which there is seated a deformable washer 74 having a protuberance 76 on its underside which is embraced by the flange 73, and on its upper side an annular recess 78 into which the down-turned flange 70 projects. There is also disposed in this annular recess 78 a deformable washer 80, a portion of which projects above the cover 28 and above which there is disposed a deformable washer 82 corresponding in shape to the deformable washer 74. That is, the washer 82 has a recess 86 therein adapted to fit over the upper portion of the deformable washer 80, and a protuberance 84 adapted to be embraced by a rigid, cup-shaped washer 88, similar to elements 76 and 72, disposed on the post below it. If the post is to terminate beneath the cover 14, a nut 90 shown at the left-hand side of Fig. 2, is threaded onto the post to engage the rigid washer 88 and to force it downwardly to squeeze the deformable washer 82 and the deformable washer 74 into engagement with the opposite sides of the cover 28, and also to squeeze the deformable washer 80 between the post and the flange 70, thereby to provide a liquid-tight seal with the post.

If, on the other hand, the terminal post is to be carried through the cover 14 of the battery to provide a binding post, an aperture 92 is formed in the cover, and through this aperture there is passed a binding post 94 having an internally threaded opening in its lower end by which it may be threadably engaged with the upper threaded end of the terminal post 26 and serve, in lieu of the nut 90, to force the rigid washer 88 downwardly as heretofore described. With this construction a rigid washer 96 is disposed over the binding post 94 to rest on the rigid washer 88. A further rigid cup-shaped washer 98 having a flange 99, similar to elements 54, 72 and 88, is then disposed about the binding post 94 to rest on the washer 96 and it in turn supports a deformable washer 100 against the underside of the cover. This deformable washer has a protuberance 103 on its lower side, an annular recess 101 therein for reception of a turned down flange 102 on the cover 14, and of a deformable washer 104. A nut 106 is threaded on the binding post above the cover 14 and provides means for pressing the cover against the deformable washers 100 and 104 to squeeze the same between it and the rigid washer 98, thereby to provide a liquid-tight seal around the binding post as it passes through the cover.

It should be understood that the present disclosure is for the purpose of illustration only, and that this invention includes all modifications and equivalents which fall within the scope of the appended claims.

We claim:

1. In combination with a battery a gland for the liquid tight passage of a lead-in member through an aperture in the top wall thereof comprising a flange bordering said aperture, a compressible washer surrounding the lead-in member at the flanged side of the aperture, said washer having an annular recess in one side for the reception of said flange, and a protuberance on its opposite side, a rigid washer surrounding said lead-in member and engaging the opposite side of said compressible washer, said rigid washer having a peripheral flange embracing said annular protuberance to restrain lateral expansion of the washer, and means threaded on said lead-in member at the opposite side of the wall for squeezing the wall against the compressible washer interposed between it and the rigid washer.

2. In combination with a battery a gland for the liquid tight passage of a lead-in member through an aperture in the top wall thereof comprising a flange bordering said aperture, a shoulder on said lead-in member at the flanged side of the aperture, a rigid washer surrounding said lead-in member resting against said shoulder, a compressible washer interposed between the rigid washer and the top wall, said compressible washer having in one side an annular recess for reception of said flange, a second compressible washer seated in said annular recess between said lead-in member and the flange, and means threaded on such lead-in member at the opposite side of the wall to squeeze the second-named washer into the annular recess in the first-named washer and the first-named washer between the top wall and the rigid washer.

3. In combination with a battery a gland for the liquid tight passage of a vent and filling tube through an aperture in the top wall thereof comprising an annular shoulder on said tube below the top wall, a rigid washer resting on said shoulder, a compressible washer resting on the rigid washer between it and the top wall, said compressible washer having an annular recess therein, said top wall having a down-turned flange bordering the aperture therein which extends into said recess, and means adjustably fastened on said sleeve above the top wall for causing said top wall to squeeze the compressible washer between it and the rigid washer.

4. In combination with a battery a gland for the liquid tight entrance of a vent and filling tube through an aperture in the top wall thereof comprising an annular shoulder on said tube below the top wall, a rigid washer resting on said annular shoulder, a deformable washer resting on the rigid washer between it and the top wall, said rigid washer having a peripheral retaining wall engaging a peripheral portion of the deformable washer, said deformable washer having an annular recess therein, a depending flange bordering the aperture in the top wall extending into said recess, and means adjustably fastened on said sleeve above the top wall for squeezing the deformable washer between the top wall and the rigid washer.

5. In combination with a battery having a case and cells therein, a vent tube welded to the top of each cell and passing upwardly therefrom to and through an aperture in the top wall of the case, an annular shoulder on said tube below the top wall of the case, a rigid washer resting on said annular shoulder, a compressible washer resting on the rigid washer between it and the top wall of the case, said compressible washer having an annular recess therein, a downturned flange bordering the aperture extending into said recess, and means threaded on the sleeve above the top wall for causing the washer to be squeezed between the top wall and the rigid washer.

6. In combination with a battery a gland for the liquid tight passage of a battery terminal post through an aperture in a cell wall comprising deformable washers surrounding the post at opposite sides of the wall, said deformable washers having annular recesses therein, a flange surrounding the aperture in the wall projecting into one of the recesses, a deformable washer surrounding a post between the same and the flange filling the opposed annular recesses, rigid washers engaging the opposite sides of the deformable washers having peripheral flanges embracing peripheral portions of said deformable washers to prevent lateral deformation thereof from the pressure, means resisting movement of one of the rigid washers on the post, and means engaging the other washer for moving it toward the restrained rigid washer to squeeze the deformable washers into engagement with the opposite sides of the wall.

CARL BERG.
MARCUS BERG.

REFERENCES CITED

The following references are of record in the file of this patent:

UNITED STATES PATENTS

| Number | Name | Date |
| --- | --- | --- |
| 1,256,006 | Ford | Feb. 12, 1918 |
| 1,323,307 | Noble et al | Dec. 2, 1919 |

FOREIGN PATENTS

| Number | Country | Date |
| --- | --- | --- |
| 525,199 | France | May 30, 1921 |
| 869,489 | France | Nov. 7, 1941 |